(12) United States Patent  (10) Patent No.: US 6,343,881 B1
Yaginuma                   (45) Date of Patent: Feb. 5, 2002

(54) CAMERA SHUTTER APPARATUS

(75) Inventor: Daisuke Yaginuma, Tokyo (JP)

(73) Assignee: Nidec Copal Corporation (JP)

( * ) Notice: Subject to any disclaimer, the term of this patent is extended or adjusted under 35 U.S.C. 154(b) by 7 days.

(21) Appl. No.: 09/625,488

(22) Filed: Jul. 25, 2000

(30) Foreign Application Priority Data

Jul. 27, 1999 (JP) .......................................... 11-211842

(51) Int. Cl.[7] .............................. G03B 9/10; G03B 9/24
(52) U.S. Cl. ...................................... 396/449; 396/463
(58) Field of Search ................................ 396/449, 463, 396/470, 508, 471

(56) References Cited

U.S. PATENT DOCUMENTS

| | | | | |
|---|---|---|---|---|
| 5,255,037 A | * | 10/1993 | Kobayashi | 396/449 |
| 5,446,514 A | * | 8/1995 | Matsumoto | 396/463 |
| 5,502,524 A | * | 3/1996 | Bovenzi et al. | 396/449 |
| 5,602,610 A | * | 2/1997 | Akimoto et al. | 396/449 |

FOREIGN PATENT DOCUMENTS

JP 2-123336 5/1990
JP 3-89223 4/1991

* cited by examiner

Primary Examiner—Alan A. Mathews
(74) Attorney, Agent, or Firm—Nixon Peabody LLP; Thomas W. Cole

(57) ABSTRACT

In a camera shutter apparatus, a shutter blade is arranged movably In an open direction and a close direction relative to a lens aperture for opening and closing the lens aperture from a home position to perform an exposure operation. A setting member is provided to operate when setting the lens aperture at a predetermined diameter for holding the shutter blade to a stop position corresponding to the predetermined diameter with a biasing force. A drive source is provided for generating a driving force necessary for moving the shutter blade. A controller is provided to operate when moving the shutter blade from the home position to the stop position so as to set the lens aperture and then moving the shutter blade in the close direction for an exposure operation. The controller controls the drive source to regulate a magnitude of the driving force sufficient for activating the shutter blade from the home position and smaller than the biasing force of the setting member to hold the shutter blade at the stop position in abutment against the setting member.

6 Claims, 7 Drawing Sheets

CAMERA SHUTTER APPARATUS

BACKGROUND OF THE INVENTION

1. Field of the Invention

The present invention relates generally to a camera shutter having a shutter blade that also functions as a diaphragm for defining an effective diameter of a lens aperture.

2. Description of Related Art

Conventionally, when taking a picture of an object by use of a still camera, a photographer sometimes wants to optimize a combination of a lens aperture size and a shutter speed according to a picture shot situation. For such a purpose, a camera system is available in which a diaphragm aperture plate for defining the effective diameter of the lens aperture is arranged separately from a shutter blade for opening and closing the lens aperture. In such a camera system, the diaphragm and the shutter blade are mounted individually. Even a camera having one or two steps of aperture stops in a simple manner uses the above-mentioned construction, if a certain aperture size accuracy is required. Especially, in exposure control of a digital still camera using a CCD (Charge Coupled Device), the number of aperture steps may be small but high aperture size accuracy and high-speed shutter blade operation are required. This is because CCD-based digital cameras have a narrow latitude.

However, the above-mentioned conventional camera system requires more than one actuator for driving the diaphragm aperture plate and the shutter blade separately from each other, thereby causing serious limitations in terms of manufacture cost and space efficiency. For an alternative means, a structure is known in which the shutter blade also functions as the diaphragm. In this structure, the shutter blade is stopped halfway between an open position and a closed position to obtain a predetermined diaphragm aperture size. To do this, the shutter blade must be stopped halfway by means of a mechanical stopper, and then this mechanical stopper must be released to close the shutter blade. This inevitably complicates the configuration of the mechanism of the camera.

SUMMARY OF THE INVENTION

It is therefore an object of the present invention to provide a camera shutter apparatus for solving the above-mentioned problems.

In carrying out the invention, there is provided a camera shutter apparatus basically comprising a shutter blade, a setting member, a drive source, and a controller. The shutter blade is adapted to move in open and close directions relative to a lens aperture from a home position to open and close the lens aperture for an exposure operation. The setting member can hold the shutter blade with a biasing force at a stop position corresponding to a predetermined diameter of the lens aperture for setting the lens aperture with the predetermined diameter. The drive source generates a variable driving force necessary for moving the shutter blade. When moving the shutter blade from the home position to the stop position so as to set the lens aperture and then moving the shutter blade in the close direction for an exposure operation, the controller controls the drive source to generate a driving force sufficient for starting or activating the shutter blade from the home position and smaller than the biasing force of the setting member, thereby holding the shutter blade at the stop position in abutment against the setting member. Preferably, in order to set the lens aperture with different diameters, at least two setting members are arranged which can selectively hold the shutter blade at different stop positions having different diameters. Preferably further, a pair of shutter blades are arranged and adapted to move in linked association with each other. One of these shutter blades abuts with one of the two setting members to set the lens aperture at a first diameter, while the other abuts with the other setting member to set the lens aperture at a second diameter. Preferably still, at least two shutter blades are arranged and adapted to move in linked association with each other, and an auxiliary setting member is arranged which imparts an biasing force smaller than that of the setting member. In such a case, one of the shutter blades abuts against the setting member to be held to the stop position, and the other of the shutter blades abuts against the auxiliary setting member to suppress an unnecessary play of the other shutter blade. In one form, the shutter blade is held at the stop position after the shutter blade is started in the close direction for setting the lens aperture from the home position at which the lens aperture is fully open, and the controller controls the drive source to raise the driving force to move the shutter blade forward from the stop position in the close direction for fully closing the lens aperture. In another form, the shutter blade is held at the stop position after the shutter blade is started in the open direction for setting the lens aperture from the home position at which the lens aperture is fully closed, and the controller controls the drive source to reverse the driving force to move the shutter blade backward from the stop position in the close direction for fully closing the lens aperture.

According to the invention, the shutter blades are made to function also as a diaphragm, thereby eliminating use of an additional drive motor conventionally required for driving a diaphragm aperture plate. To hold the shutter blades to the stop position for setting the effective aperture diameter, the output of the drive source is made greater than an initial shutter blade driving torque and smaller than the biasing force of the setting member. When moving the shutter blades from the stop position to the fully closed position, a drive force greater than the biasing force of the setting member is applied to the shutter blades. For example, when moving the shutter blades from the open home position into the close direction, the output of the drive source is regulated smaller than the biasing force of the setting member, hence the movement of the shutter blades into the close direction is restricted or blocked by the setting member and is held at the stop position corresponding to the desired aperture diameter. After passing of a predetermined time, increasing the output of the drive source over the biasing force moves the shutter blades from the stop position to the fully closed position. Thus, electrical controlling of the drive source can set the shutter blades at a desired stop position corresponding to a desired aperture diameter, thereby eliminating use of conventional complicated mechanical stopper structures.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

This invention will be described in further detail by way of example with reference to the accompanying drawings. Now, referring to FIG. 1, there is shown a schematic top view illustrating a camera shutter apparatus practiced as one preferred embodiment of the invention. As shown, the camera shutter apparatus 0 is built in a digital camera. The shutter apparatus 0 is assembled by use of a front base plate 1. It should be understood that a rear base plate, not shown, is mounted on the front base plate 1 under its lower surface by means of screws 18 and 19. A lens aperture 1A is formed in the front base plate 1 at its center portion. In addition, support pins 12L, 12R, 13L, and 13R are implanted on the front base plate 1 for pivotally supporting various components.

Figure 1:
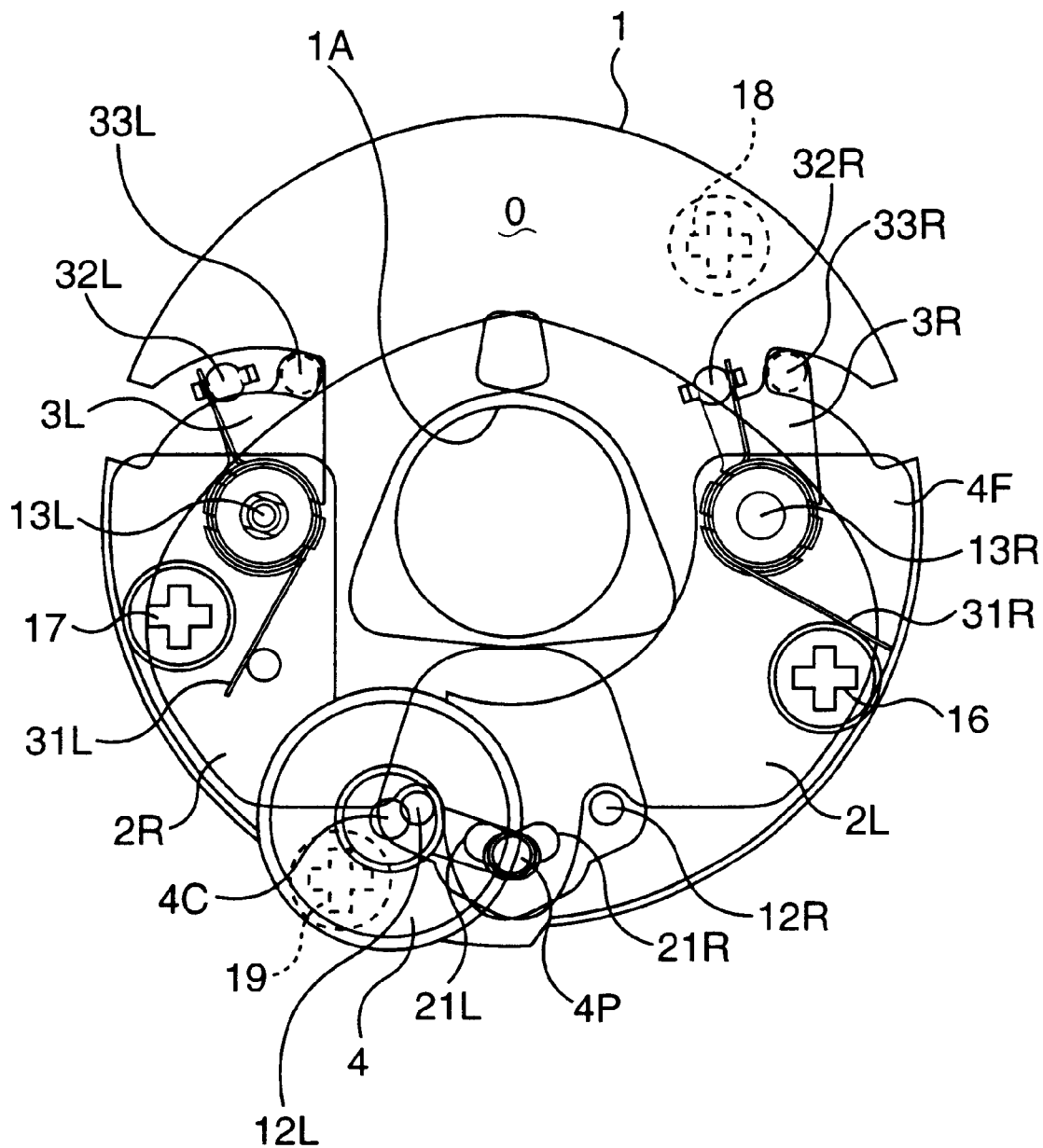
FIG. 1 is a top view illustrating a camera shutter apparatus practiced as one preferred embodiment of the invention.

A pair of shutter blades 2L and 2R, a pair of setting members 3L and 3R, and a drive motor 4 as a drive source are mounted on the front base plate 1. In addition, a controller including a CPU (Central Processing Unit) for controlling the drive motor 4 is assembled in this shutter apparatus 0 as an electric component. The pair of shutter blades 2L and 2R are arranged movable in open and close directions relative to the lens aperture 1A, and starts from a home position to open and close the lens aperture 1A for an exposure operation of the digital still camera. FIG. 1 shows the home position of the pair of shutter blades 2L and 2R. In the present embodiment, the pair of shutter blades is placed fully open in the home position. Actually, the pair of shutter blades 2L and 2R is accommodated in a blade room formed between the front base plate 1 and the above-mentioned rear base plate. The shutter blade 2L is pivotally movable around the support pin 12L and displaceable from the fully open position to the fully closed position in the counterclockwise direction. The other shutter blade 2R is arranged pivotally movable around the support pin 12R and displaceable from the fully open position to the fully closed position in the clockwise direction.

The setting members 3L and 3R can operate when setting the lens aperture 1A to a predetermined diameter for temporarily holding the shutter blades 2L and 2R respectively to a stop position corresponding to the predetermined diameter of the lens aperture with a predetermined biasing force. In the present embodiment, the lens aperture 1A is stopped down to different effective diameters, so that at least two setting members 3L and 3R are provided to selectively regulate the shutter blades 2L and 2R to the stop positions corresponding to different diameters. To be specific, the shutter blades 2L and 2R move in linked association with each other. Stated otherwise, the shutter blades 2L and 2R are inter-linked or interlocked with each other. The shutter blade 2L functions when abutting the first setting member 3L to stop down the lens aperture 1A to a first aperture diameter. The other shutter blade 2R functions when abutting the second setting member 3R to stop down the lens aperture 1A to a second aperture diameter. To be more specific, the first setting member 3L is mounted on the front base plate 1 so as to be pivotally supported by the support pin 13L. A contact pin 33L adapted to abut with the shutter blade 2L is mounted on a tip end of the first setting member 3L. In addition, a spring 31L for urging the first setting member 3L clockwise is mounted around the support pin 13L. A free end of the spring 31L is latched to a latch 32L formed at the tip end of the first setting member 3L. The second setting member 3R is mounted on the front base plate 1 so as to be pivotally supported by the support pin 13R. A contact pin 33R adapted to abut with the shutter blade 2L is formed on the tip of the second setting member 3R. In addition, a spring 31R for urging the second setting member 3R counterclockwise is mounted around the support pin 13R. The free end of the spring 31R is latched to a latch 32R formed at the tip of the second setting member 3R.

The drive motor 4 mounted on the front base plate 1 generates as the drive source a variable driving force for moving the shutter blades 2L and 2R. In this example, the drive motor 4 comprises a moving magnet actuator having a drive pin 4P, and bi-directionally rotates around a shaft 4C. The drive pin 4P penetrates through the front base plate 1 from top to bottom, and engages with a through-hole 21L formed in the shutter blade 2L and another through-hole 21R formed in the shutter blade 2R. When the drive motor 4 rotates counterclockwise from the state shown, the shutter blade 2L pivots counterclockwise around the support pin 12L by means of the drive pin 4P, and the shutter blade 2R pivots clockwise around the support pin 12R in linked association with the shutter blade 2L. Consequently, the pair of shutter blades 2L and 2R travel concurrently in the closing direction. Conversely, when the drive motor 4 rotates clockwise, the pair of shutter blades 2L and 2R travel in the opening direction. It should be noted that the drive motor 4 is mounted on the front base plate 1 via a motor frame 4F. The motor frame 4F is mounted on the front base plate 1 by means of a pair of screws 16 and 17.

When moving the shutter blades 2L and 2R from the home position to the stop position to set the lens aperture and then moving in the closing direction for an exposure operation, the controller incorporated in this shutter apparatus 0 controls the drive motor 4 to generate a driving force, which is sufficient for starting or initiating the shutter blades 2L and 2R from the home position, but is weaker than the biasing force of the setting members 3L and 3R, thereby holding the shutter blades 2L and 2R in abutment with the setting members 3L and 3R at the stop position. Then, after passing of a predetermined time, the controller controls the drive motor 4 so as to increase the driving force of the drive motor to move the shutter blades 2L and 2R to the fully closed position. It should be noted that, in the home position, a rotor of the drive motor 4 is attracted clockwise by a permanent magnet of the motor. When a driving force overcoming this attractive force is imparted, the shutter blades 2L and 2R are activated to move from the home position.

Figure 2:
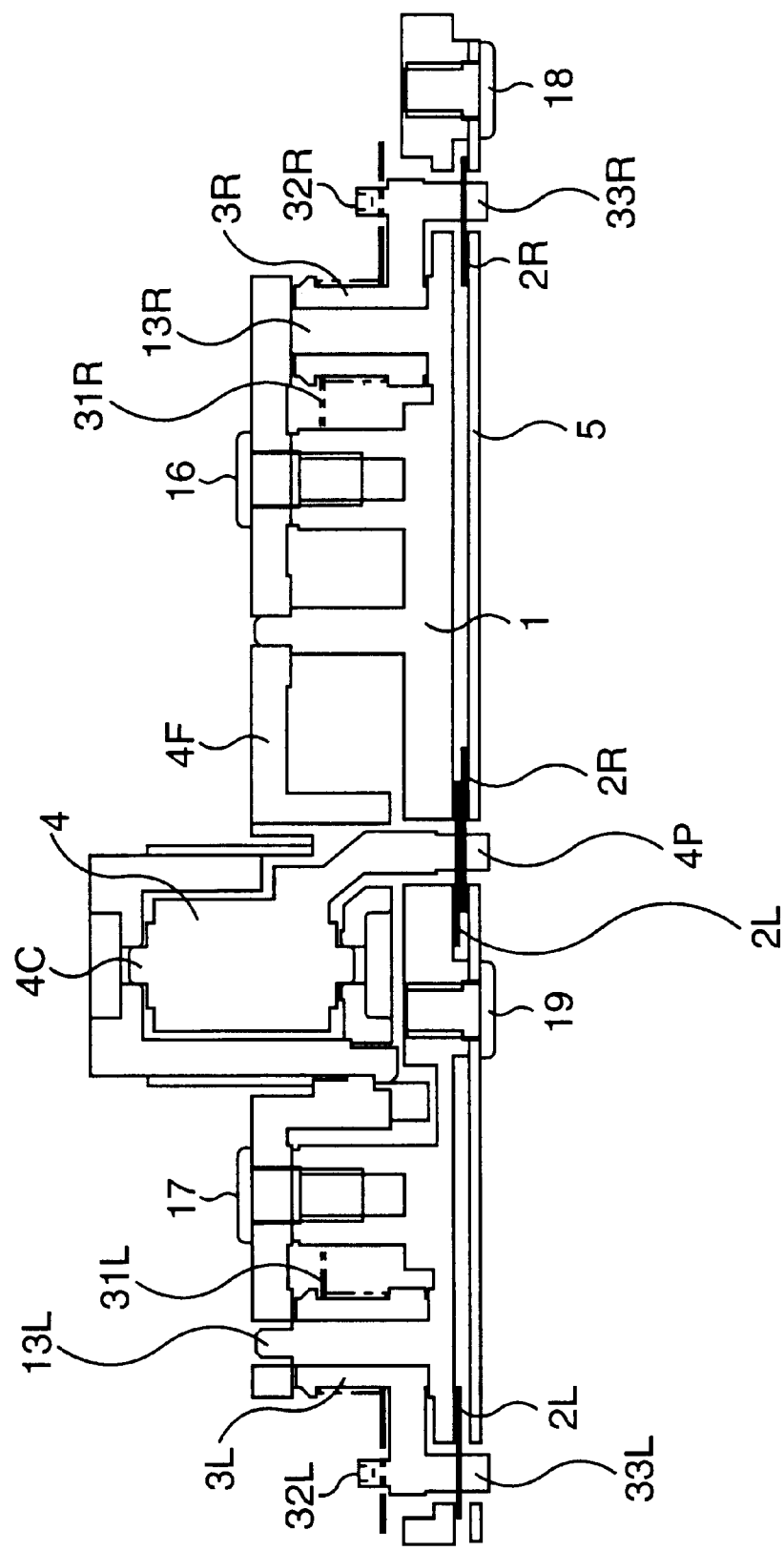
FIG. 2 is a schematic cross section illustrating the above-mentioned camera shutter apparatus.

Referring to FIG. 2, there is shown a schematic diagram illustrating a cross section of the shutter apparatus 0 shown in FIG. 1. The shutter apparatus 0 comprises the front base plate 1 and the rear base plate 5. As described, the rear base plate 5 is mounted on the front base plate 1 with the screws 18 and 19. The blade room is formed between the base plates 1 and 5. This blade room accommodates the pair of shutter blades 2L and 2R. The drive motor 4 is mounted on the front base plate 1 via the motor frame 4F. As described, the motor frame 4F is mounted on the front base plate 1 with the screws 16 and 17. The drive motor 4 is of moving magnet type, which is rotatable around the shaft 4C. The drive pin 4P projecting from the moving magnet penetrates the front base plate 1 from top to down, and engages with the shutter blades 2L and 2R. Namely, the drive pin 4P of the drive motor 4 links with the shutter blades 2L and 2R to open and close them. The first setting member 3L is pivotally supported by the pin 13L implanted in the front base plate 1. The contact pin 33L formed on the tip of the first setting member 3L penetrates through the front base plate 1 from top to down to abut with the shutter blade 2L. The spring 31L is engaged between the support pin 13L and the latch 32L, thereby urging or biasing the first setting member 3L. Likewise, the second setting member 3R is pivotally supported by the support pin 13R implanted in the front base plate 1. The contact pin 33R formed on the tip of the second setting member 3R is adapted to abut with the shutter blade 2R. The spring 31R is mounted between the support pin 13R and the latch 32R to urge or bias the second setting member 3R.

Figure 3:
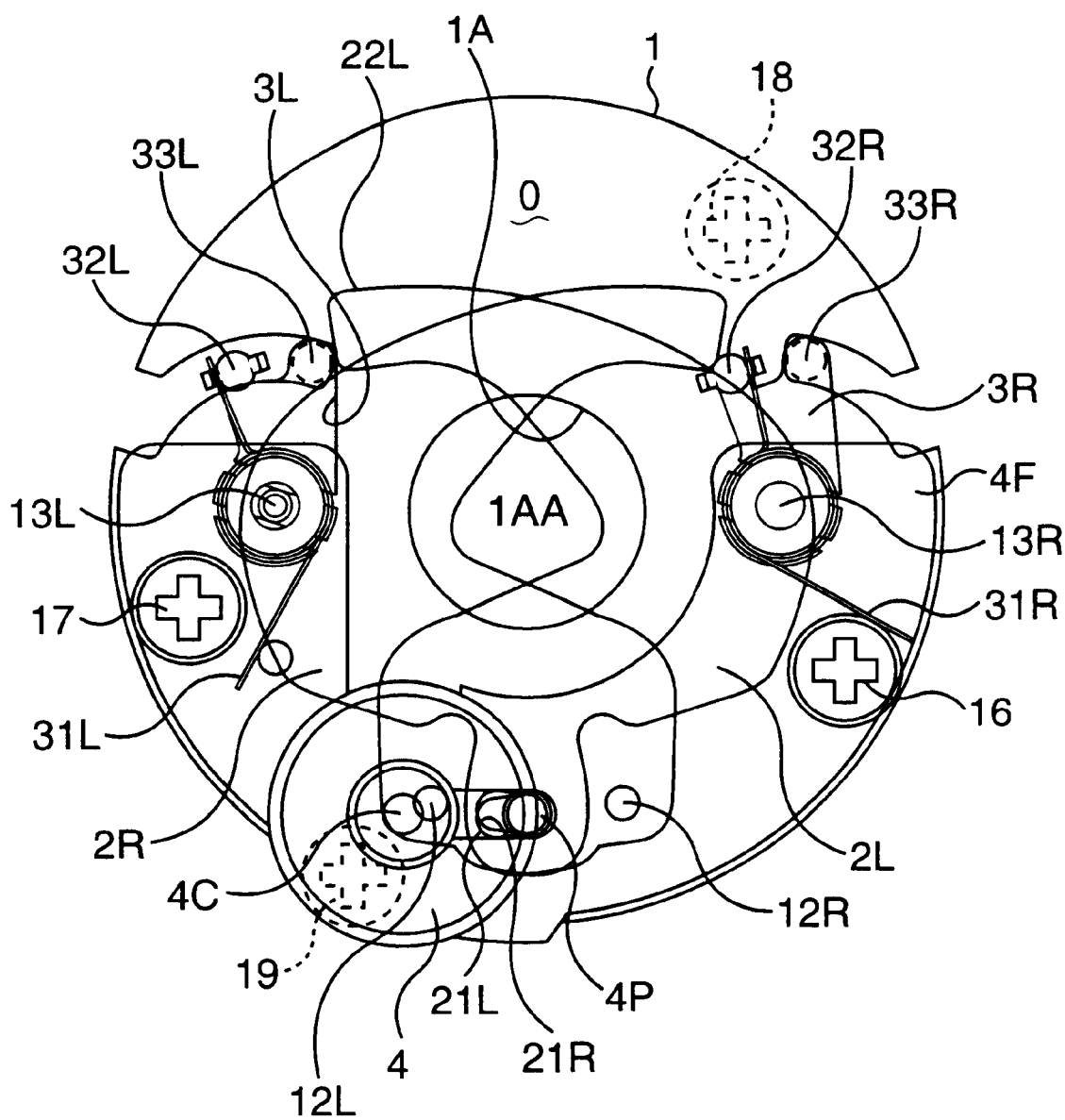
FIG. 3 is a top view illustrating an operation of the above-mentioned camera shutter apparatus.

Referring to FIG. 3, there is shown the first stop position of the shutter apparatus 0 shown in FIG. 1. When the driving force is applied to the shutter blades 2L and 2R from the home position shown in FIG. 1, the shutter blades travel in the closing direction as described. If a driving force T is set smaller than a biasing force T1 of the first setting member 3L, the shutter blade 2L stops with its tip 22L abutting against the first setting member 3L. At this moment, the lens aperture 1A is partially blocked by the pair of shutter blades 2L and 2R, thereby forming a first aperture stop 1AA. To be specific, the shutter blade 2L pivotally moves around the support pin 12L counterclockwise and stops with the tip 22L abutting against the contact pin 33L of the first setting member 3L. The other shutter blade 2R cooperatively interlocked with the stopped shutter blade 2L also stops as a matter of course. When the driving force of the drive motor 4 is increased from the state in which the aperture stop 1AA is set, the shutter blades 2L and 2R further travel in the closing direction to execute an exposure operation of the digital still camera.

It should be noted that, in the illustrated first stop position, the shutter blade 2L is placed in abutting with the first setting member 3L, while the other shutter blade 2R is caught by the interlocking with the shutter blade 2L with a slight play. This play of the shutter blade 2R may hinder the positional accuracy. To prevent this problem, an auxiliary setting member imparting a smaller biasing force than that of the first setting member 3L may be arranged to abut against the shutter blade 2R, thereby absorbing the play thereof. For example, if one-step aperture setting is used unlike the multi-setting of the aperture diameter in the two steps as with the present embodiment, the necessity for the second setting member 3R is eliminated. Consequently, the second setting member 3R may be used as the above-mentioned auxiliary setting member by adjusting the position and the biasing force of the second setting member 3R.

Figure 4:
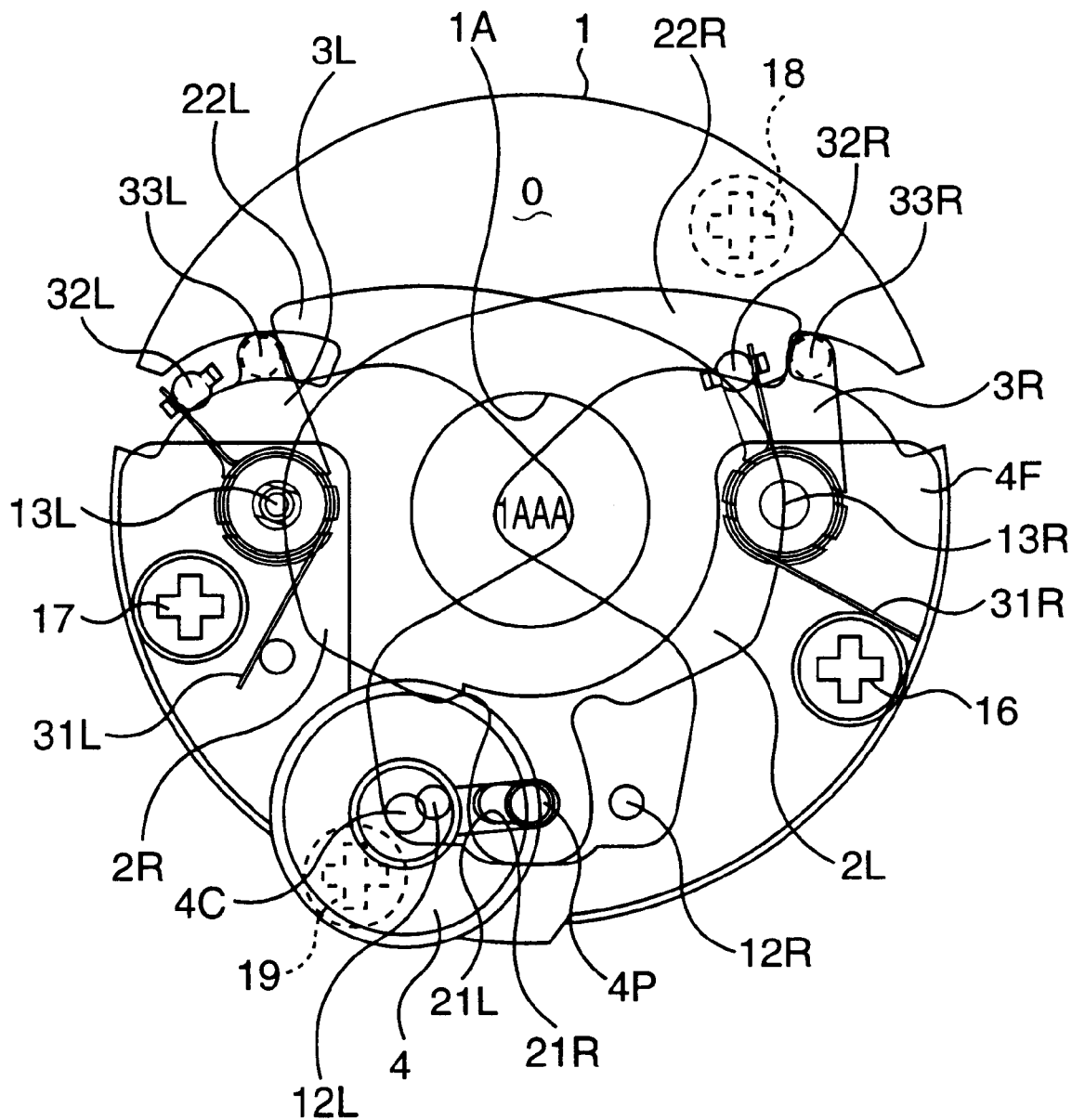
FIG. 4 is another top view illustrating an operation of the above-mentioned camera shutter apparatus.

Referring to FIG. 4, there is shown a schematic top view illustrating a second stop position of the camera shutter apparatus shown in FIG. 1. When the driving force T greater than the biasing force T1 of the first setting member 3L but smaller than the total of the biasing force T1 of the first setting member 3L and the biasing force T2 of the second setting member 3R is applied to the pair of shutter blades 2L and 2R from the home position shown in FIG. 1, these shutter blades pass the first stop position shown in FIG. 3 and stop at the second stop position shown in FIG. 4, thereby forming a second aperture stop 1AAA. As shown, the lens aperture 1A is mostly blocked by the shutter blades 2L and 2R, whereby a small effective aperture is formed at the center. Because the driving torque T imparted by the drive motor 4 is greater than the biasing force T1 of the first setting member 3L, when the tip 22L of the shutter blade 2L abuts with the contact pin 33L of the first setting member 3L, the shutter blade 2L does not stop but further travels or advances in the closing direction. In cooperation with the shutter blade 2L, the other shutter blade 2R also travels in the closing direction. However, when the tip 22R of the shutter blade 2R abuts with the contact pin 33R of the second setting member 3R, the shutter blade 2R stops. Because the driving force T imparted by the drive motor 4 is smaller than the total of the biasing force T1 of the first setting member 3L and the biasing force T2 of the second setting member 3R, the shutter blades 2L and 2R cannot overcome the biasing force of the second setting member 3R, thereby traveling no further in the closing direction.

Figure 5:
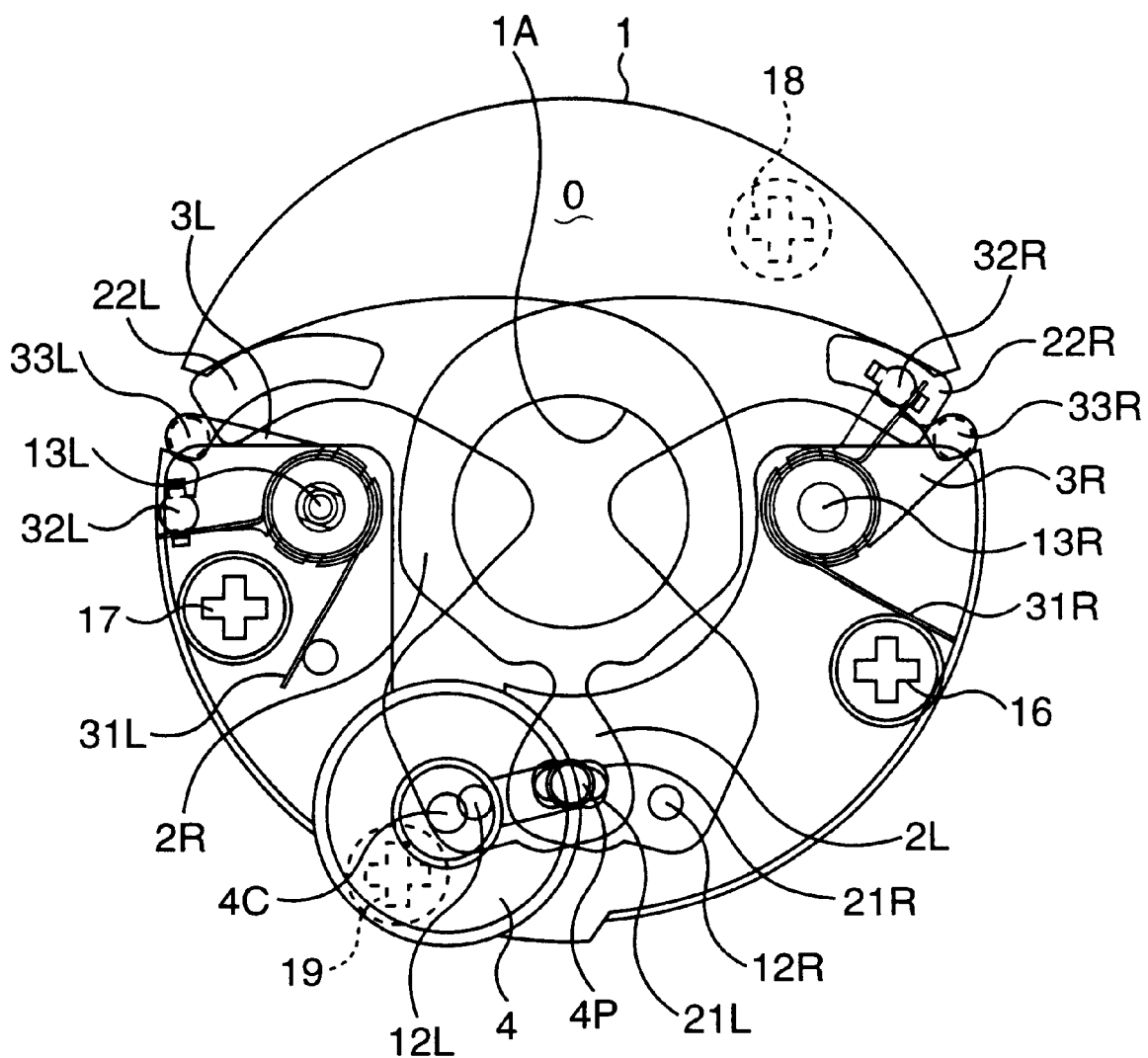
FIG. 5 is still another top view illustrating an operation of the above-mentioned camera shutter apparatus.

Referring to FIG. 5, there is shown a schematic top view illustrating a fully closed position of the camera shutter apparatus 0. At this fully closed position, the pair of shutter blades 2L and 2R completely block the lens aperture 1A, thereby finishing the exposure operation. When the driving force of the drive motor 4 is switched up from the first stop position shown in FIG. 3 or the second stop position shown in FIG. 4, the shutter blades 2L and 2R overcome the biasing forces of the first setting member 3L and the second setting member 3R, thereby reaching the fully closed position. The shutter blade 2L pivots the first setting member 3L counterclockwise to the extreme while the tip 22L abuts against the contact pin 33L of the first setting member 3L. Likewise, the shutter blade 2R pivots the second setting member 3R clockwise to the extreme while the tip 22R maintains abutment with the contact pin 33R of the second setting member 3R.

Figure 6A:
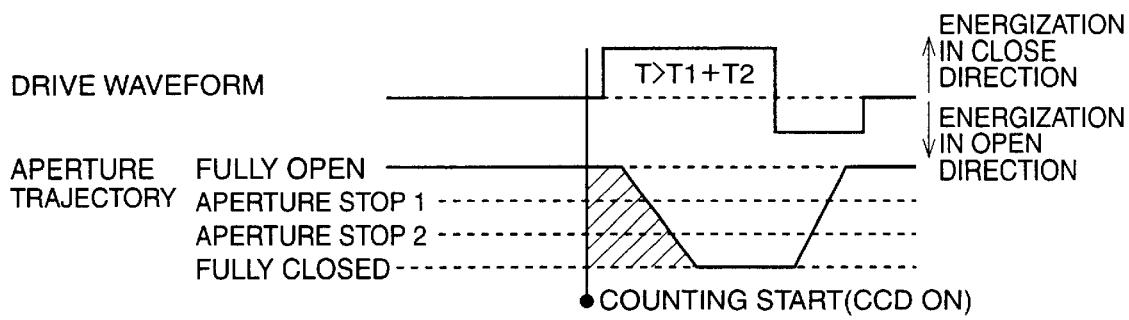
FIGS. 6A, 6B, and 6C are timing charts for illustrating operations of the above-mentioned camera shutter apparatus.
Figure 6B:
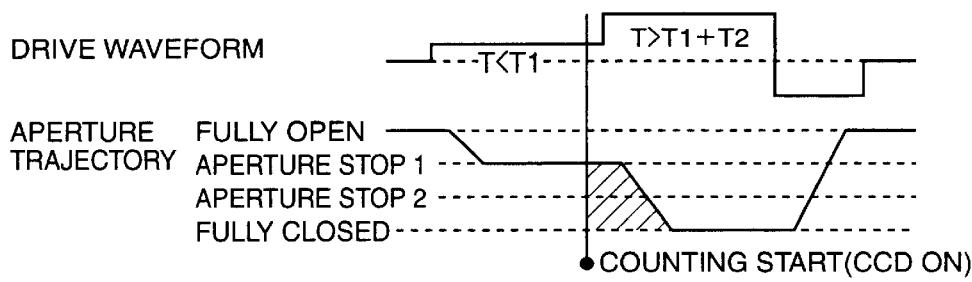
Figure 6C:
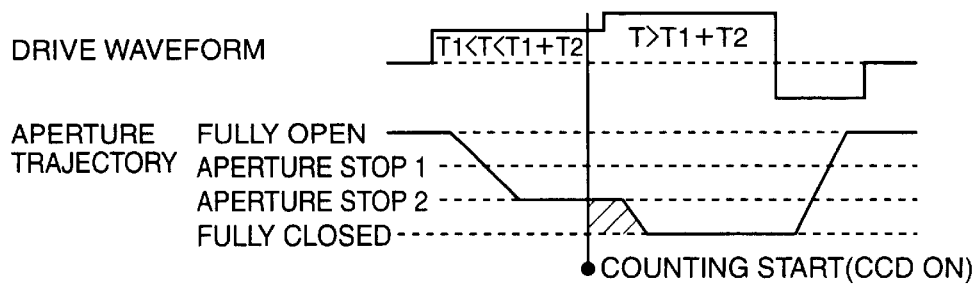

Referring to FIGS. 6A, 6B, and 6C, there are shown schematic timing charts illustrating exposure operations of the camera shutter apparatus 0. FIG. 6A schematically shows an exposure operation in which the shutter blades directly travel from the fully open position (namely, the home position) shown in FIG. 1 to the fully closed position shown in FIG. 5. This is an exposure operation executed without performing any aperture set operation or stopping-down operation. In this case, an exposure time count is started upon charging of the CCD built in the digital still camera. Upon completion of the counting, a motor drive waveform is raised for the closing direction energization. The quantity of this energization is set such that the driving force T imparted by the motor is greater than the total of the biasing force T1 of the first setting member and the biasing force T2 of the second setting member. Application of the great driving force to the shutter blades causes them to travel at a high speed from the fully open position directly to the fully closed position with a predetermined mechanical delay, thereby executing one shot of the exposure operation. Then, the motor drive waveform is switched to the open direction energization to return the shutter blades from the fully closed position to the fully open home position.

FIG. 6B shows an exposure operation performed from the first stop position (aperture stop 1). First, the driving force T smaller than T1 is applied to the shutter blades to move them from the fully open home position to the first stop position (aperture stop 1) shown in FIG. 3. In this state, the exposure time counting is started. Upon completion of the counting, the driving torque T is made greater than the total of T1 and T2. This causes the shutter blades to travel from the aperture stop 1 to the fully closed position to thereby perform one shot of the exposure operation. As seen from the comparison between FIG. 6A and FIG. 6B, the exposure light quantity indicated by a hatching pattern shown in FIG. 6B is smaller than that shown in FIG. 6A.

FIG. 6C shows an exposure operation executed from the second stop position shown in FIG. 4. First, the motor driving force T is set between T1 and T1+T2 to move the shutter blades from the fully open position to the second stop position shown in FIG. 4, thereby setting an aperture stop 2. Then, the exposure time counting is started upon the CCD is charged on. Then, the motor driving force T is raised greater than the total of T1 and T2. This causes the shutter blades to travel from the aperture stop 2 to the fully closed position, thereby completing the exposure operation. The total exposure light quantity indicated by the hatching pattern becomes much smaller than the total exposure light quantity shown in FIG. 6B.

Figure 7A:
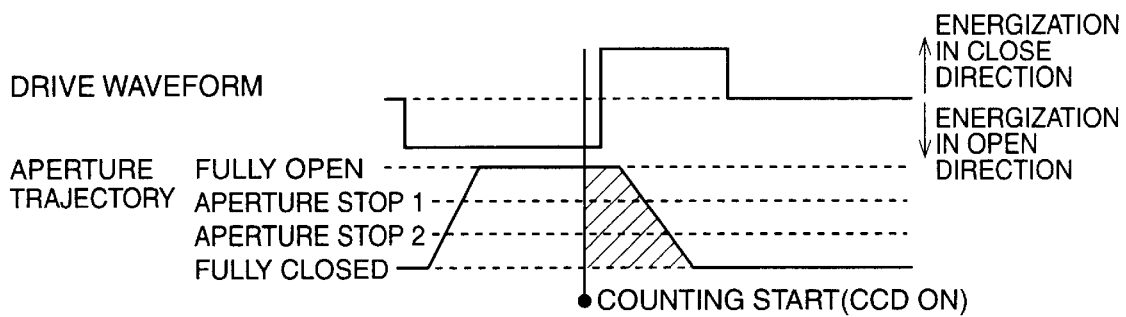
FIGS. 7A, 7B, and 7C are timing charts for illustrating operations of a camera shutter apparatus practiced as another preferred embodiment of the invention.
Figure 7B:
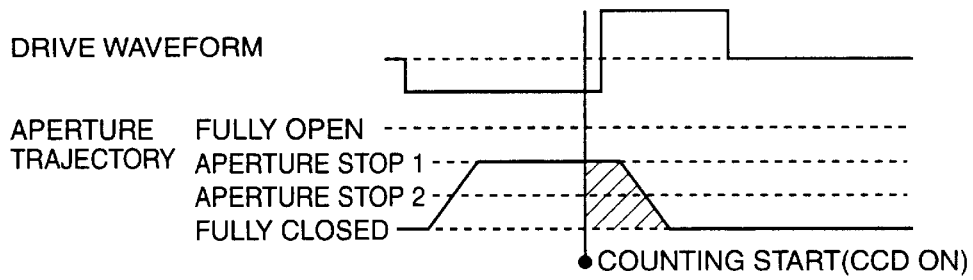
Figure 7C:
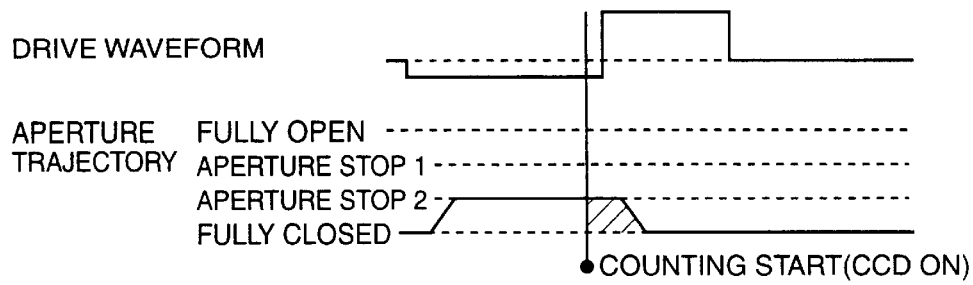

Thus, in the embodiment shown in FIGS. 6A, 6B, and 6C, the shutter blades are caught by the halfway stop positions when the lens aperture is stopped down between the fully open home position and the fully closed position. The controller controls the drive motor so as to increase the driving force over the biasing force, thereby further moving the shutter blades from the stop position to the closed position to fully close the lens aperture. On the other hand, in an example shown in FIGS. 7A, 7B, and 7C, the shutter blades are caught by the halfway stop positions when the lens aperture is stopped down between a fully closed home position and an open position. Then, the controller controls the motor so as to reverse the driving force, thereby moving the shutter blades from the stop position to the closed home position to fully close the lens aperture. To be more specific, in the case shown in FIG. 7A, the motor driving force is made greater in the open direction, thereby moving the shutter blades from the fully closed home position to the fully open position. In this state, the exposure time counting is started and, after passing of a predetermined time, the driving force is reversed from the open direction to the close direction to move the shutter blades from the fully open position to the fully closed position, thereby completing one exposure operation. In the case shown in FIG. 7B, a driving force of a medium magnitude is applied to the shutter blades to move them from the fully closed home position to the partial aperture stop 1. In this state, the exposure time counting is started upon CCD charging-on. When the counting is completed, the motor driving force is reversed from the open direction to the close direction to move the shutter blades from the partial aperture stop 1 to the fully closed position, thereby completing one shot of the exposure operation. In the case shown in FIG. 7C, a driving force of a relatively small magnitude is applied to the shutter blades to displace them from the fully closed home position to the partial aperture stop 2. In this state, the shutter speed counting is started upon CCD charging-on. When the counting is completed, the motor driving force is reversed from the open direction to the close direction to move the shutter blades from the partial aperture stop 2 to the fully closed position, thereby completing one shot of the exposure operation.

As described and according to the invention, the shutter blades are made to function also as a diaphragm, thereby eliminating use of an additional drive motor conventionally required for the diaphragm aperture plate. Consequently, the novel constitution is significantly advantageous in savings of manufacture costs and space requirements. In addition, the driving force for setting the shutter blades to desired aperture positions can be electrically controlled, thereby simplifying the structure of the setting members as compared with the conventional configuration.

While the preferred embodiments of the present invention have been described using specific terms, such description is for illustrative purposes only, and it is to be understood that changes and variations may be made without departing from the spirit or scope of the appended claims.

What is claimed is:

1. A camera shutter apparatus comprising:

a shutter blade arranged movably in an open direction and a close direction relative to a lens aperture for opening and closing said lens aperture from a home position to perform an exposure operation;

a setting member operative when setting said lens aperture at a predetermined diameter, for holding said shutter blade to a stop position corresponding to said predetermined diameter with a biasing force;

a drive source for generating a driving force necessary for moving said shutter blade; and a controller operative when moving said shutter blade from said home position to said stop position so as to set said lens aperture and then moving said shutter blade in said close direction for an exposure operation, for controlling said drive source to regulate a magnitude of said driving force sufficient for starting said shutter blade from said home position and smaller than said biasing force of said setting member to hold said shutter blade at said stop position in abutment against said setting member.

2. The camera shutter apparatus according to claim 1, comprising at least two setting members for selectively holding said shutter blade at different stop positions corresponding to differently predetermined diameters for setting said lens aperture at said differently predetermined diameters.

3. The camera shutter apparatus according to claim 2, comprising a pair of shutter blades adapted to move in linked association with each other, one of said shutter blade abutting with one of said two setting members to set said lens aperture at a first predetermined diameter while the other of said shutter blades abutting with the other of said two setting members to set said lens aperture at a second predetermined diameter.

4. The camera shutter apparatus according to claim 1, comprising at least two shutter blades adapted to move in linked association with each other, and an auxiliary setting member which imparts a biasing force smaller than that of said setting member, wherein one of said two shutter blades abutting with said setting member to be held at said stop position and the other of said two shutter blades abutting with said auxiliary setting member to suppress an unnecessary play of the other shutter blade.

5. The camera shutter apparatus according to claim 1, wherein said shutter blade is held at said stop position after said shutter blade is started in said close direction for setting said lens aperture from said home position at which said lens aperture is fully open, and wherein said controller controls said drive source to increase said driving force over said biasing force to further move said shutter blade from said stop position in said close direction for fully closing said lens aperture.

6. The camera shutter apparatus according to claim 1, wherein said shutter blade is held at said stop position after said shutter blade is started in said open direction for setting said lens aperture from said home position at which said lens aperture is fully closed, and wherein said controller controls said drive source to reverse said driving force to move back said shutter blade from said stop position in said close direction for fully closing said lens aperture.

* * * * *